L. PARKER.
Bee Hive.
No. 38,328.
Patented April 28, 1863.
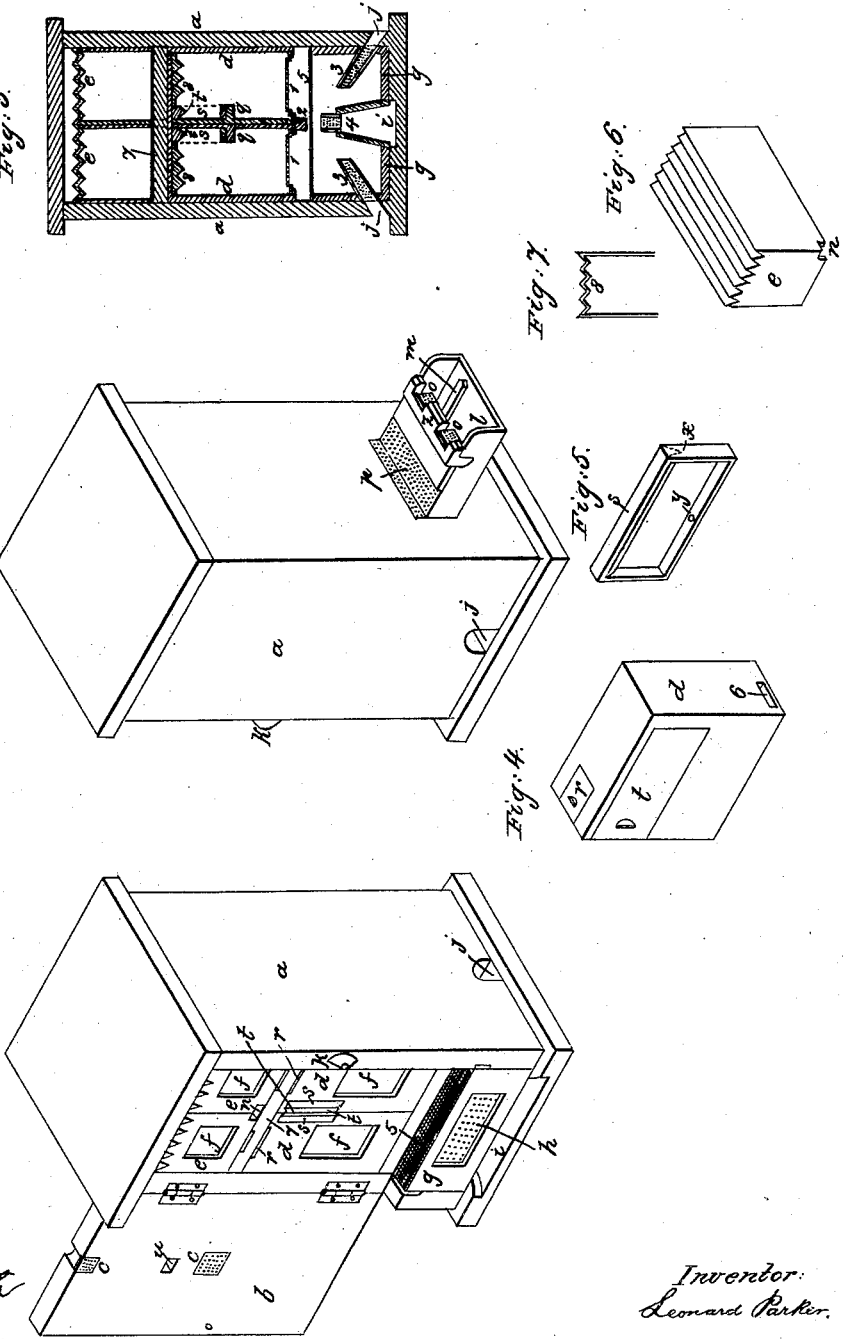

UNITED STATES PATENT OFFICE.

LEONARD PARKER, OF WINTERSET, IOWA.

IMPROVEMENT IN BEE-HIVES.

Specification forming part of Letters Patent No. 38,328, dated April 28, 1863.

*To all whom it may concern:*

Be it known that I, LEONARD PARKER, of Winterset, in the county of Madison, in the State of Iowa, have invented certain new and useful Improvements in Bee-Hives; and I do hereby declare that the following is a full and exact description thereof, reference being had to the accompanying drawings, and to the letters of reference marked thereon.

The nature of my invention consists in the construction and arrangement of miller-trap, alighting-board, homesteads, frames for brood-comb, and surplus-honey boxes, the whole being constructed, arranged, and combined, in the manner hereinafter described.

To enable others skilled in the art to make and use my invention, I will proceed to describe its construction and operation.

In the accompanying drawings, Figure 1 is a perspective view of the bee-hive, representing the door open, showing the arrangement of the miller-traps, homesteads, and surplus-honey boxes. Fig. 2 is a perspective view of the hive, and represents the arrangement of the alighting-board. Fig. 3 is a cut or sectional view of the hive, miller-trap, homesteads, frames for brooding-combs, and surplus-honey boxes. Fig. 4 is a perspective view of the homestead. Fig. 5 is a perspective view of the frame for brood-comb. Fig. 6 is a perspective view of the surplus-honey box. Fig. 7 is a cut or sectional view of the surplus-honey box.

In the accompanying drawings, $a$ is the outside case of the hive, which is furnished with a door, $b$, in which are placed two ventilators, $c$, and a tube, $u$. The ventilators $c$ are used for the ingress of pure air and for the egress of impure air. The tube $u$, which is placed in the door so as to come directly opposite to the openings $n$ in the surplus-honey boxes $e$, is used for the escape of the bees after the boxes are filled with honey. The ends of the surplus-honey boxes are made of wood, and the sides and top of pasteboard, the top being corrugated, the corrugations running lengthwise of the top, as represented in Fig. 6. By this arrangement of the corrugated top the bees are induced to build their comb lengthwise of the box. The homesteads $d$ are constructed, as represented in Fig. 4, with a movable bottom and two slide-doors, and furnished with a frame for brood-comb. The bottoms 1 consist, in part, of wire-cloth, which will admit air into the homesteads, and thereby add greatly to the health and comfort of the bees. The doors $t$ are used for the purpose of uniting the two homesteads, so as to accommodate a large swarm of bees by allowing them free access to both homesteads. The doors $t$ are also used for the purpose of dividing a large swarm, when so desired, into two colonies. By this arrangement of the doors $t$ the hive is adapted to a large or small swarm of bees. The sliding doors $t$ also answer another and a very desirable purpose—to wit, the frame for the brood-comb being placed in the homestead next to the door $t$, the condition of the brood-comb may be ascertained without removing the frames from the homesteads, by simply withdrawing the doors $t$. The doors $r$ are used for the purpose of allowing the bees to pass up through openings in the division-board 7 into the surplus-honey boxes, or for cutting off the communication to the surplus-honey boxes. The top of the homesteads are furnished with movable racks, to which the bees attach their comb. These racks are held to their places by means of screws. By the use of these movable racks the comb can be entirely removed from the homesteads by simply detaching the racks from the tops. The frames for brood-comb are made in the form represented in Fig. 5, the top bar of which is made in V form, as represented by the dots at $x$. The bottom bar is furnished with an opening, (marked $y$,) so that the bees may pass to the comb in the frame. By the use of this opening the bees are prevented from leaving holes in the comb. The frame is held to its place in the homestead by means of the bar $q$, through which is an opening corresponding with the opening $y$ of the frame. The frames in swarming-time, in old hives, will be full of comb containing brood and larva, which may by means of the frames be removed and placed in other hives for the benefit of new swarms, thus greatly benefiting the new swarms and inducing the bees to remain and take care of the brood. When frames are taken from old hives, empty ones should be put in their place. The miller-trap $g$, which is placed under the homestead $d$, is furnished with conducting tubes or ways, which consist of perforated tin. The entrance to the side tubes, 3, are made in the sides of the outside case, $a$, and marked $j$, and the entrance to the tube 4 is formed by a recess, $i$, which is made in the bottom of the hive. The top of the trap is covered with wire-cloth 5, and in the front end of the trap is placed a door, $h$, which is made of perforated tin. It will be observed that by the arrangement of the three places of entrance $j\ j$ and $i$ to the trap and the use of the perforated tubes, doors, and wire-cloth cover an abundance of air is admitted into the homesteads. The alighting-board $l$ is furnished with a guide, $m$, and trap-doors $o$, and the top or cover of the board consists, in part, of perforated tin. The guide $m$ is used for turning the bees all into one of the homesteads, when so desired, and it may be so arranged that the bees may come out of one homestead and enter the other, which will be of great advantage when it becomes necessary to remove the old comb from any one of the homesteads. The trap-doors $o$, which are secured to the bar $z$, are used for the purpose of excluding the drones from the hive, when it is desirable. That part of the cover $p$ which consists of perforated tin is used for a ventilator when the entrance to the homesteads is closed up, which will be necessary in winter to keep the bees from flying out and perishing in the snow.

The operation of my improvement is as follows: After hiving the bees the door $h$ of the miller-trap should be left open for a few days until the bees have become accustomed to the entrance to the hive at the alighting-board, otherwise the bees might be ensnared in the trap; but after they have become familiar with the alighting-board and the entrance to their homesteads, then the door $h$ should be closed for the purpose of entrapping the millers, which will be induced by the smell which arise from the bees to enter the trap through the openings $j$ and $i$. After they have once entered the trap $g$ escape is made impossible by the arrangement of the tubes 3 and 4. It will be observed that the trap may be withdrawn from the hive for the purpose of destroying the millers without interfering with the bees. The bees enter the homesteads through the openings 6 in the homesteads, and they build their comb along the racks 8. After the homesteads are full of comb the slide-doors $r$ are withdrawn, so that the bees may pass up, through the openings made in the division-board 7, into the surplus-honey boxes $e$. When the surplus-honey boxes are full, which may be ascertained by an examination of the boxes, by means of the observing-glass $f$, which is placed in the front end of the boxes, (glass is also placed in the homesteads for a like purpose,) communication is cut off from the surplus-honey boxes and the homesteads by means of the doors $r$, and the bees, finding these passages closed, will pass out through the openings $n$ in the boxes $e$ into the tube $u$, and enter the homesteads by the alighting-board, and thus leave the surplus-honey boxes as free from bees as though they had never been in them. The drones are excluded from the hive by adjusting the bar $z$ so that the trap-doors $o$ are too low for them to pass under. This may be done without interfering with the workers, the drones being much larger. The drones in passing out can raise the doors, but cannot raise them to enter the hive, and, being shut out, they will try to enter the hive through the openings $j$ and $i$, and will be ensnared in the miller-trap, and may be drowned or otherwise destroyed. When it is desirable to have the bees occupy only one of the homesteads, the guide $m$ must be moved to one side. When moved to the left, the communication is cut off from the left-hand homestead, and when moved to the right communication is cut off from the right-hand homestead. The guide $m$ answers another purpose—to wit, when the hive is attacked by robber bees communication to the hive may in part be cut off by turning the guide $m$ to the right or left, and thus leave but a small entrance, which will enable the swarm to protect itself against their enemy, who, being repulsed, will seek to enter the hive at the openings $j$ and $i$, and become entrapped in the miller-trap, where they may be detained until evening, and then allowed to return home or destroyed, as thought best.

To remove old comb from the homesteads, unscrew the racks 8, from the top, and let the comb down, supplying the homesteads with empty racks.

Having thus described the nature, construction, and operation of my improvement, what I claim as my invention, and desire to secure by Letters Patent of the United States, is—

1. The miller trap $g$, when arranged and constructed as herein described, for the purpose set forth.

2. The frame $s$, for brood-comb, when used in combination with the homestead $d$, as herein described, and for the purpose set forth.

3. The arrangement of the guide $m$, doors $o$, and perforated cover $p$, when used in combination with the alighting-board and entrance to the hive, as herein described, and for the purpose set forth.

LEONARD PARKER.

Witnesses:
GEO. GREGORY,
S. G. BECKWITH.